United States Patent [19]

Bentzien et al.

[11] Patent Number: 5,691,647

[45] Date of Patent: Nov. 25, 1997

[54] OBJECT SENSING DEVICE AND METHOD FOR USING SAME

[75] Inventors: Dean Bentzien, Brookfield; Hermann Dohl, Richfield; Frank Riedl, Sussex; Armin Dohl, Germantown, all of Wis.

[73] Assignee: Tooling & Production Systems, Inc., Sussex, Wis.

[21] Appl. No.: 398,472

[22] Filed: Mar. 3, 1995

[51] Int. Cl.⁶ .......................... G01R 27/02; G08B 21/00
[52] U.S. Cl. .......................... 324/714; 324/715; 340/680; 340/870.38
[58] Field of Search .................................. 324/713, 714, 324/715; 340/870.38, 680

[56] References Cited

U.S. PATENT DOCUMENTS

| | | | |
|---|---|---|---|
| 2,216,086 | 9/1940 | Meenan | 340/870.38 |
| 2,218,872 | 10/1940 | Carris | 340/680 X |
| 2,538,415 | 1/1951 | Ergen | 340/870.38 |
| 2,751,474 | 6/1956 | Reichel et al. | 340/870.38 |
| 2,772,395 | 11/1956 | Runaldue | 324/714 |
| 3,296,521 | 1/1967 | Wildberger | 340/870.38 |
| 3,441,846 | 4/1969 | Petrohilos | 324/714 |
| 3,575,518 | 4/1971 | Waldmann | 340/680 X |
| 3,669,557 | 6/1972 | Mitchell | 340/680 X |
| 3,747,085 | 7/1973 | Bala et al. | 340/680 |
| 3,818,334 | 6/1974 | Rosenberg | 340/680 |
| 4,057,755 | 11/1977 | Piesche | 324/714 |
| 4,088,899 | 5/1978 | Miller et al. | 340/680 X |
| 4,246,577 | 1/1981 | Shima et al. | 340/680 |
| 4,290,065 | 9/1981 | Gleason | 340/870.38 |
| 4,381,507 | 4/1983 | Parmer | 340/870.38 |
| 4,392,375 | 7/1983 | Eguchi et al. | 340/870.38 |
| 4,806,914 | 2/1989 | Thomas et al. | 340/680 |
| 4,839,579 | 6/1989 | Ito | 340/870.38 |
| 5,001,464 | 3/1991 | Tanaka | 340/680 |
| 5,049,827 | 9/1991 | Tasmo | 324/714 |
| 5,343,142 | 8/1994 | Sasaki | 324/714 |

FOREIGN PATENT DOCUMENTS

| | | |
|---|---|---|
| 3013054 | 2/1980 | Germany. |
| 3003-431 | 8/1981 | Germany. |
| 3138603 | 9/1981 | Germany. |
| 642761 | 4/1984 | Switzerland. |

*Primary Examiner*—Kenneth A. Wieder
*Assistant Examiner*—Diep Do
*Attorney, Agent, or Firm*—Wheeler Kromholz & Manion

[57] ABSTRACT

A sensing device and a method for sensing the presence and absence of an object in a machine using the sensing device. The sensing device generally including a sensing mechanism, a resistive element, and a control mechanism communicatively coupled to the sensing mechanism and resistive element. The sensing mechanism being coupled to the resistive element. The method comprising actuating the sensing mechanism so that it senses the location of the object. Recording the voltage across the resistive element in the control mechanism when the sensing mechanism senses the location of the object. Reactuating the sensing mechanism at least one more time to sense the location of the object. Measuring a subsequent voltage across the resistive element when the sensing mechanism is reactuated and comparing the subsequent voltage with the recorded voltage across the resistive element when the resistive element sensed the location of the object. Sending a signal to the machine when the subsequent voltage is not substantially equal to the recorded voltage.

11 Claims, 3 Drawing Sheets

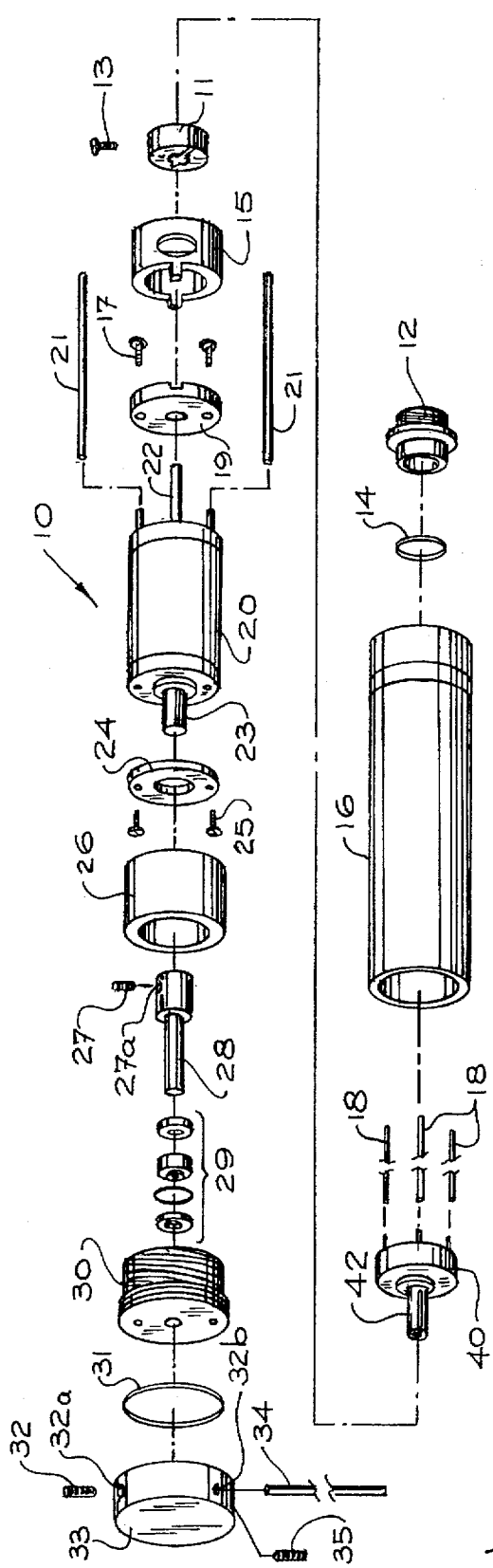
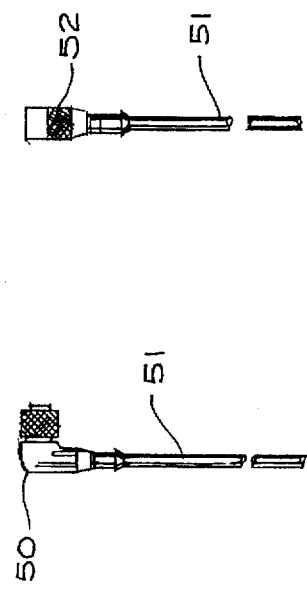
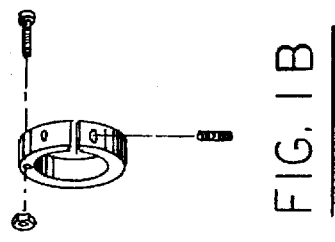
FIG. IA
FIG. IB
FIG. IC
FIG. ID

OBJECT SENSING DEVICE AND METHOD FOR USING SAME

BACKGROUND OF THE INVENTION

The present invention relates generally to the field of sensing devices and specifically to the field of sensing devices for monitoring the presence of a tool or other object in an automatic machine. The present invention also has application in free space monitoring. The inventors know of no prior art that either teaches or shows the invention disclosed and claimed herein.

In automatic machines an undetected broken or missing tool, or other object, can result in significant damage to the machine, the tooling, or the workpieces. Consequently, it is very important to have sensing devices which are capable of detecting a broken or missing tool. This need has resulted in the development of sensing devices which typically consist of a sensing head and a control unit.

The sensing head, which includes a sensing needle or arm projecting radially from the output end of a shaft driven by a motor encapsulated within the sensing head, is adapted to be mounted on the automatic machine so that the sensing needle, in response to the energization of the motor, will be moved from a starting position through space normally occupied by the monitored object.

The control unit, which is typically installed in the electrical control cabinet of the automatic machine and is electrically connected to the sensing head, initiates a detecting cycle of the sensing head at the start of each cycle of the machine and receives from the sensing head a signal that the monitored object has or has not been detected, so that an appropriate output signal can be sent to the machine control which would typically result in a cycle continue or a cycle stop command. In a detecting cycle of the sensing head, its motor is energized to move the sensing needle from the starting position through a certain swing angle and return to the starting position. During movement through this swing angle, the sensing needle will either contact the monitored object or will complete the full swing angle of movement, and from these two possible results the control unit provides the appropriate output signal to the machine control.

Typical commercially available sensing heads are operable on a sensing cycle with initial movement of the sensing needle in a clockwise direction, in a counterclockwise direction, or in either direction. Typical sensing heads are available with fixed direction swing angles such as 45, 90, 120, and 180 degrees. Variable swing angle sensing heads are also available and utilize a motor with an encoder within the sensing head itself and the desired swing angle is electronically learned by counting the number of steps generated by the encoder. For example the device disclosed in German Patent No. 30 03 431.

The present invention provides a smart sensing device in which the presence or absence of an object is determined by measuring a voltage value taken across a variable resistive element like a potentiometer. The present invention provides an initial "teach in" cycle for, preferably, either clockwise or counterclockwise initial rotation of the sensing needle thereby providing an extremely versatile sensing device that will always know the desired voltage value and which can be reprogrammed to other desired voltage values without the need to buy a new sensing device so that the presence or absence of an object is determined.

Further, the present invention in its preferred form provides a sensor that will remember the tool or object location through 300 degrees of clockwise or counterclockwise swing direction. Because the present invention uses voltage values to determine and remember the proper swing angle no miniature reversing gear box or encoders are required thereby increasing the general reliability of the unit.

Typical types of machines in which the present invention would have application are, but are not limited to, automatic machines, multi-spindle screw machines, chuckers, CNC lathes, machining centers, transfer machines, trunnion machines, and special purpose machines.

SUMMARY OF THE INVENTION

The present invention is a sensing device and a method for using the sensing device. The sensing device confirms either the absence or presence of an object by physically touching it with a sensing needle or arm. The sensing arm is a small gage section of wire connected to the shaft of a motor. The motor rotates the sensing arm until contact with the tool or object has been made. Rotation can be in either a clockwise or a counterclockwise direction and is selectable by the user on an associated control panel.

Attached to the motor is a resistive element. Typically this will be a variable resistor like a potentiometer. In most applications the resistive element will operate in a rotary fashion but it is important to appreciate that the invention is not limited to a rotary resistive element and that, depending upon the desired application, the resistive element could be non-rotary, linear, or any other shape required or believed desirable in the proposed application.

Generally the invention will work in a system having a sensing assembly containing the motor, resistive element, and the sensing needle; a control unit or control box assembly which energizes the sensing head, interprets data, and provides a corresponding output signal; and a cable which connects the control box and sensing head assemblies. It should be understood that the motor is not necessary to practice the present invention. For example, a sensing device conforming to the invention as claimed herein could be one in which the object to be monitored could be moved into contact with the sensing device rather than the sensing device being moved into contact with the object to be monitored.

The motor will begin the sequence at a fixed stop-starting point. The motor is activated in the selected rotary direction for a predetermined period of time. When contact with the tool has been made or until forward motion has been stopped a resulting voltage value, taken across a resistive element, is stored or recorded into memory. When the predetermined time expires the motor reverses and returns to the fixed stop-starting point.

When the cycle is again repeated, the previous stored value must be achieved. If this value does not compare to the stored value within an allowable low tolerance difference, the determination of a missing tool or object can be made. The acceptable low tolerance difference required will vary depending upon the particular application. The tolerance should be sufficient to account for normal operational conditions. For example, in the present invention, in a system wherein the sensing arm is six (6) inches long, the acceptable low tolerance difference or deviation from the recorded voltage is from −6% to +4%, where the needle is 0.050" in diameter.

Accordingly, the sensing device of the present invention may be generally summarized as a sensing mechanism and a resistive element with the sensing mechanism coupled to the resistive element. The sensing mechanism comprising a sensor and a motor.

The resistive element being a variable resistor having a predetermined range of resistance. The sensing device of further including a control mechanism communicatively coupled or connected to the sensing mechanism and the resistive element. The resistive element having at least one known voltage across it. The control mechanism having a record of the known voltage across the resistive element. The control mechanism capable of producing a signal in response to a failure to record a subsequent voltage across the resistive element that is substantially equal to the known voltage so that a low tolerance deviation from the known voltage is sensed or recorded.

Alternatively, the sensing device could be generally described as including a sensing head having a housing, a reversible motor mounted therein, a drive shaft rotatably driven by the motor and having a portion projecting from one end of the housing. The sensing device including a sensing needle attached to the projecting portion of the drive shaft and extending generally radially therefrom. The sensing needle being adapted to contact an object to be detected in response to rotation of the drive shaft in the one direction from a starting position. The invention further including a resistive element coupled to the sensing needle through the drive shaft for the purpose of using a voltage measurement to determine if the sensing needle is contacting the object to be detected.

Additionally, the sensing device could also include or be combined with a control means for controlling a machine containing an object or tool. The control means being connected to the sensing head and having a record of a known voltage across the resistor which results from a chosen swing angle of the sensing needle. The control means capable of recording a predetermined voltage across the resistor at a predetermined time or desired swing angle of the sensing needle. The control means also capable of monitoring a subsequent voltage across the resistor and sending a control signal to the machine when a subsequent voltage reading taken across the resistor fails to substantially equal known previously recorded voltage.

Also, the present invention may generally and alternatively be described as a method for sensing the presence and absence of an object in a machine by using a sensing device including a sensing mechanism having a resistive element and a control mechanism communicatively coupled to the sensing mechanism. The method generally comprising actuating the sensing mechanism so that it senses the location of the object. Recording the voltage across the resistive element when the sensing mechanism senses the location of the object. Reactuating the sensing mechanism at least one more time to sense the location of the object. Measuring a subsequent voltage across the resistive element when the sensing mechanism is reactuated and comparing the subsequent voltage with the recorded voltage across the resistive element when the resistive element sensed the location of the object. Sending a fault signal to the machine from the control mechanism when the subsequent voltage is not substantially equal to the recorded voltage and sending an OK signal when the subsequent voltage is substantially equal to the recorded voltage.

Also, the method could then include a step in which the control means signals the machine and the machine is substantially deactivated or stopped. The inventors generally assume that in most applications the automatic machine will be deactivated when the presence or absence of an object or tool is detected but deactivation of the automatic machine may not be desirable or immediately desirable in all possible applications and thus the method of the present invention could be modified to take into account those particular applications.

Finally, while the structure and method of the present invention disclosed herein use a measurement of voltage taken across the variable resistor at a given position of the sensing arm to sense the presence or absence of an object it should be clearly understood that since voltage, current, and resistance are all related to each other by the equation $E=IR$ (where E=voltage, I=current, and R=resistance) that the invention disclosed herein could be practiced by measuring current or resistance instead of the voltage across the variable resistor at a point where the swing arm is in contact with either an object to be monitored or a stop point when free space monitoring is being performed. Further, since voltage, current, and resistance can be mathematically related to other values like wattage it should be understood that the present invention should not be limited to an interpretation requiring only measurements of voltage, current, or resistance.

These and other benefits of the present invention will be apparent to one skilled in the art from the following description.

DESCRIPTION OF THE DRAWINGS

FIG. 1A is an exploded view of the sensing unit assembly comprising the sensing mechanism and the resistive element.

FIG. 1B is an elevational view of a split clamping collar which goes over the housing 16 of the sensing unit assembly 10 and is used to secure the sensor to a mounting bracket manufactured by the user for mounting to the machine.

FIG. 1C is an elevational view of a 90 degree connector.

FIG. 1D is an elevational view of a straight connector.

DETAILED DESCRIPTION

Figure 2:
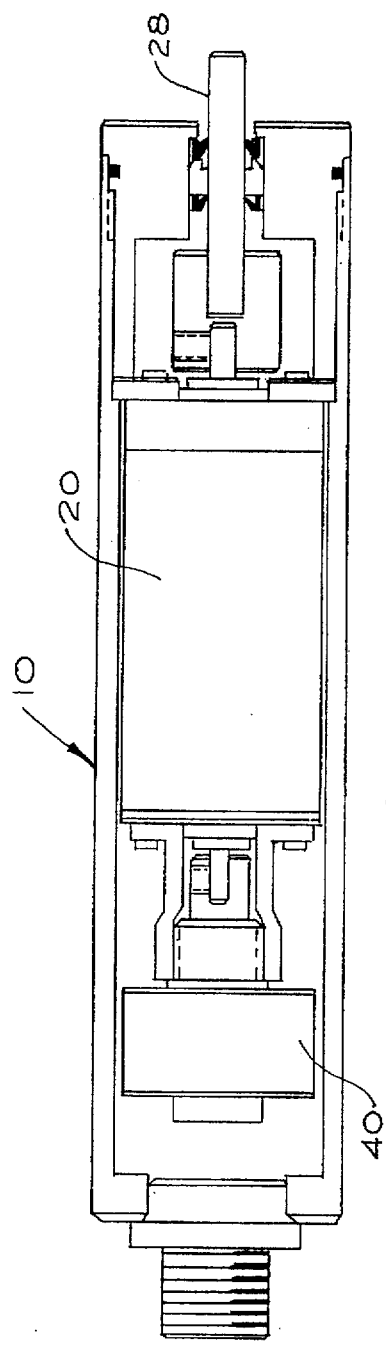
FIG. 2 is a plan view showing the sensing unit assembled without the sensing arm. Please note this is also an alternative structure of the present invention in that the figure shows an alternatively designed coupling for properly coupling the motor to the resistive element.
Figure 6:
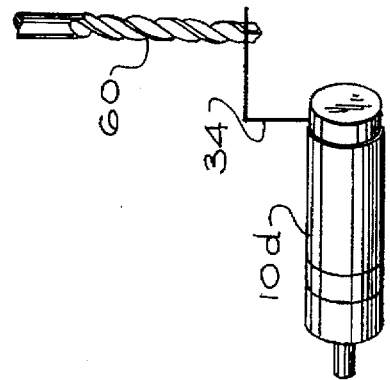
FIG. 6 is a perspective view showing a third alternative embodiment of the sensing unit shown in FIG. 5.
Figure 5:
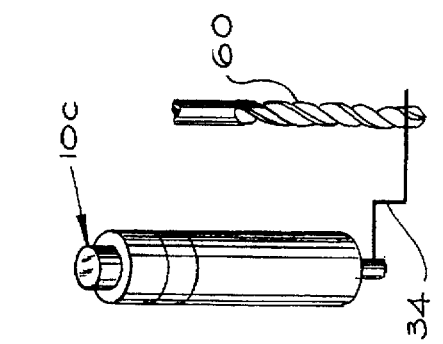
FIG. 5 is a perspective view showing a second alternative embodiment of the sensing unit shown in FIG. 4.
Figure 4:
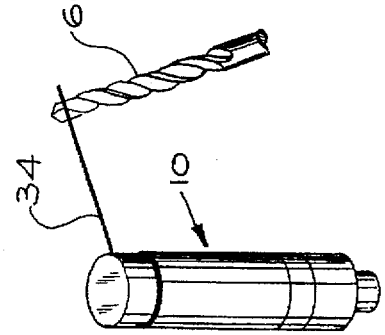
FIG. 4 is a perspective view showing the preferred embodiment of the present invention in which the sensing unit is shown assembled and the sensing arm is contacting a tool on a machine.
Figure 3:
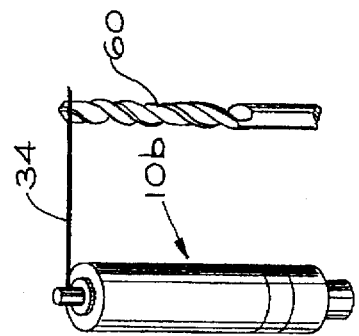
FIG. 3 is a perspective view showing a first alternative structure of the sensing unit assembled and the sensing arm contacting a tool on a machine.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Referring to FIG. 1A the sensing unit assembly 10 of the present invention may be seen. The sensing unit assembly 10 is composed of a cable connector 12, an O-ring 14, a cylindrical housing 16, wires 18, a potentiometer 40 having a shaft 42, a clamp 11 having a screw 13, a coupling 15, a spacer 19 having screws 17, a d.c. motor 20 having wires 21 and motor shafts 22 and 23, a spacer 24 having screws 25, a spacer 26, a shaft extension having opening 27a and screw 27, a head 30 housing a plurality of seals and bushings 29, an O-ring 31, a cap 33 having openings 32a and 32b and set screws 32–35, and a sensing arm or needle 34. The sensing unit assembly 10 is assembled as shown in FIG. 1A.

Referring to FIGS. 1C and 1D a 90 degree connector 50 and a straight connector 52 may be seen. Connectors 50 and 52 connect to cable connector 12. A cable 51 extends from each cable connector 50 and 52 to connect the sensing unit 10 with a control unit 70.

Figure 7:
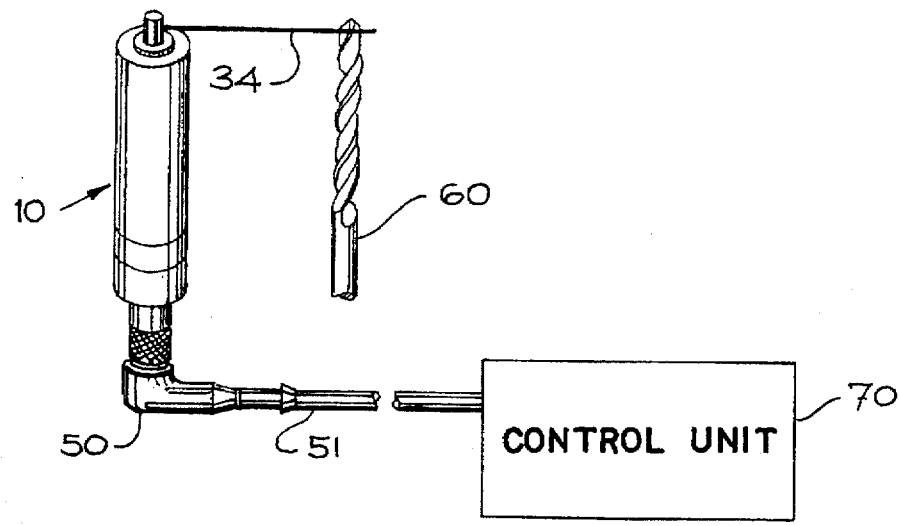
FIG. 7 is a plan view showing the relationship of a tool on a machine, the sensing unit, the connector, and the control box.

Referring to FIG. 7 the control unit 70 may generally be seen connected via the cable 51 and connector 50 to the sensing unit 10. The sensing arm 34 of the sensing unit 10 is rotatably connected to the sensing unit 10 and is contacting the tool 60 on the machine (not shown).

Referring to FIG. 1A it may be seen that set screw 35 holds sensing arm 34 to cap 33 and that set screw 32 holds cap 33 onto shaft 28. Thus, the sensing arm 34 is coupled to the motor shaft 23 of the electric motor 20 through the cap 33 and the head 30. The motor shaft 23 is turned by actuation of the d.c. motor 20. Motor shaft 22 of the d.c. motor 20 is generally coupled to shaft 42 across the potentiometer 40 by clamp 11. Shaft 22 is turned or rotated by actuation of the d.c. motor 20. Wires 21 of the d.c. motor 20 lead to the cable connector 12 which, through cable 51 is connected to the control unit 70. Preferably the control unit 70 is a control box like the TCU 250 control box supplied by Tooling & Production Systems, Inc., located at P.O. Box 143, Sussex, Wis. 53089. Wires 18 across the potentiometer 40 are also connected via the cable connector 12 to the control unit 70 wherein the desired voltage information is recorded in an EEPROM (Erasable Expandable Programmable Read Only Memory) or similar device for use with a microprocessor or similar device running a program to interpret the information a provide the necessary signals. In the system of the present invention the control unit 70 is provided with a chip that is a microprocessor having the designation 87C752; e.g., a Motorola microprocessor with the designation 87C752. This type of microprocessor is currently used in the preferred embodiment of the system disclosed herein. The type of EEPROM used in the present invention is one having the designation 24C01A. Accordingly, a suitable control box having a suitably programmed microprocessor with the required EEPROM is available from Tooling & Production Systems, Inc., located at P.O. Box 143, Sussex, Wis. 53089 wherein the control box is the TCU 250 control box, the EEPROM has the designation 24C01A and the microprocessor in the control box is a microprocessor having the designation 87C752.

The potentiometer 40, generally like all variable resistors, e.g., a volume control on a radio, has internal stops (not shown) that prevent rotation of the shaft 42 beyond a predetermined range. In the potentiometer 40 that range is 300 degrees but it could be any number of degrees of rotation depending upon the location of the stops in the type potentiometer or variable resistor selected. In the present invention the internal stops across the potentiometer 40 are taken advantage of by energizing the d.c. motor 20, which is coupled to the potentiometer 40 via motor shaft 22 and potentiometer shaft 42, so that it is energized against one of the internal stops across the potentiometer 40. This creates the start-stop point for the sensing unit assembly 10. Accordingly, an input start signal of reversal current will cause the shafts 22 and 42 to turn in a direction away from the internal stop across the potentiometer 40. Reversal of the input start signal causes the shafts 22 and 42 to turn back in the opposite direction until the internal stop across the potentiometer 20 is contacted.

Figure 8:
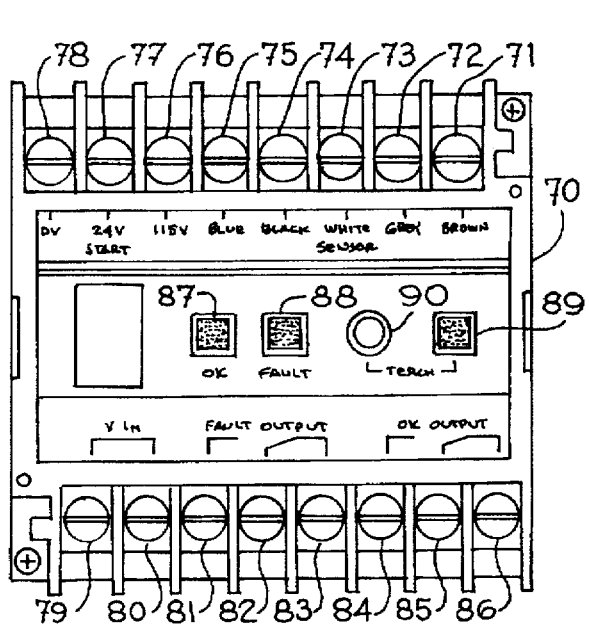
FIG. 8 is a top view of the control unit 70.
Figure 9:
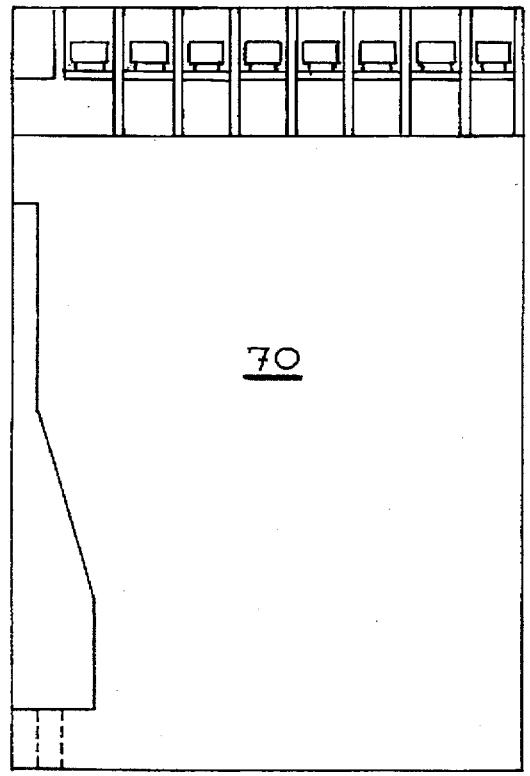
FIG. 9 is a side view of the control unit 70.

Referring to FIGS. 7 and 8 the control unit 70 may be seen in greater detail. The control unit 70 is provided with a series of terminals 71–86 for connecting the wires of the cable 51 to the control unit 70 and for making connections to power sources and to the automatic machine. The cable 51 is a five wire cable having a blue wire, a black wire, a white wire, a grey wire, and a brown wire. These wires are attached to terminals 75, 74, 73, 72, and 71, respectively. Further, the control unit 70 may be seen to have three indicator lights 87–89 and a button 90. Indicator light 87 is a green light that indicates an OK status of the machine. Indicator light 88 is a red light indicating a fault status of the machine. Indicator light 89 is an amber light indicating the sensing unit 10 is engaged in a teach cycle. Button 90 is used to initiate the teach cycle.

In the present invention the power wires are the blue wire and the black wire so the power terminals for providing power to the sensing device 10 are terminals 75 and 74. Terminals 71–53 are connected to the potentiometer 40 and are used in conjunction with the control box 70 to measure the voltage across the potentiometer 40 when the sensing arm 34 is in contact with the object whose position is to be monitored.

Accordingly, the system using the sensing device 10 works in conjunction with the control unit 70 as follows: First, a teach in procedure is conducted in which the d.c. motor 20 is actuated for a predetermined time and the sensor arm 34 is swung into contact with the tool 60. Both shafts 23 and 22 turn as a result of actuation of the d.c. motor 20. When shaft 23, coupled to sensing arm 34, swings the sensing arm 34 to a stopped position, shaft 22 also moves in a manner that is equal to, although it could also be proportional to, the movement of shaft 23. Shaft 22 is coupled to the potentiometer shaft 42. Turning shaft 22 turns shaft 42 of the potentiometer 40 resulting in a change of the voltage level across the potentiometer 40. When the sensing arm 34 is swung from its starting position and contacts the tool 60 the voltage produced across the potentiometer 40 at this point is measured and recorded since this voltage, which changes as the resistance of the potentiometer 40 changes, will be voltage which is the final voltage recorded during the predetermined period of time that the motor 20 is actuated to move the sensing arm 34 is this direction. This voltage is recorded in the EEPROM so that it is known and remembered and available for reference and use by the microprocessor. After the voltage has been recorded the sensing arm is returned to its original position since the d.c. motor 20 is energized against a stop so that when a start input energizes the motor 20 it reverses the motor 20 and the arm 34 swings away from the internal stop across the potentiometer 40. The system of the present invention is now ready for work. Second, the automatic machine is started and a checking or monitoring cycle begins. The d.c. motor 20 is actuated to swing the sensing arm 34, for the predetermined time, into contact with the tool 60 in a predetermined manner; usually the sensing arm 34 contacting the tool 60 once after each operation of the tool, e.g., drilling a hole in a workpiece. Each time the sensing arm 34 contacts the tool 60 the voltage across the potentiometer 40 is measured and compared with the known voltage that was recorded during the teach in cycle. If the voltage is within a low tolerance deviation or range that is substantially equal to the known voltage initially recorded then the sensing arm 34 swings back into position for the next cycle and the machine continues to operate. However, if a subsequently measured voltage does not substantially equal the known voltage that was initially recorded then the microprocessor of the control unit 70 sends a predetermined output signal to the machine to change its manner of operation. Usually this output signal is one which will in turn deactivate the machine preventing further damage to tooling and/or the machine. A red light or LED 88 on the control box 70 would indicate a fault condition.

The predetermined period of time is the same for both the teach in cycle and the monitoring cycle. The predetermined time can be for any period of time desired by the operator. However, the system disclosed herein will have at least three (3) different time settings for an operator of the system specifically disclosed herein to choose from to actuate the d.c. motor 20 and swing the sensor arm 34 into contact with the tool 60. The time settings for the predetermined period of time are 40 milliseconds (ms), 60 ms, and 80 ms. Each time setting substantially corresponds to a swing arc of the sensing arm 34 of 90 degrees, 180 degrees, and 300 degrees, respectively. The predetermined period of time may vary depending upon the application described.

Finally, it should be noted that the system disclosed herein preferably can operate in two different ways in its teach in cycle. First, the teach button 90 may be pressed and the teach in cycle as described above will occur. Second and alternatively, the user may simply actuate the sensing unit 10 by starting the system. In that case the first cycle to occur will be the teach in cycle described above and each subsequent cycle will be a monitoring cycle as described above.

While a suitable control unit 70 containing a suitably programmed microprocessor, namely a microprocessor having the designation 87C752, is disclosed it will be apparent from this disclosure to a person of ordinary skill in the art how to build and program the system disclosed herein. The foregoing is considered as illustrative only of the principles of the invention. Furthermore, since numerous modifications and changes will readily occur to those skilled in the art, it is not desired to limit the invention to the exact construction and operation shown and described.

What is claimed is:

1. An object sensing device for sensing the presence and absence of a tool, the object sensing device comprising:

an object sensing mechanism having a housing and a resistive element located within said housing;

the object sensing mechanism coupled to the resistive element;

the object sensing mechanism including an object sensing arm extending from and located external to said housing;

whereby the object sensing arm of the object sensing mechanism may contact an object located at a predetermined position and at a predetermined resistance of the resistive element.

2. The sensing device of claim 1 wherein the sensing mechanism comprises a sensor and a motor.

3. The sensing device of claim 1 wherein the resistive element is a variable resistor having a predetermined range of voltage.

4. The sensing device of claim 1 wherein the resistive element is a potentiometer.

5. The sensing device of claim 2 wherein the sensor is a sensing needle.

6. The sensing device of claim 2 wherein the sensor and the motor are mechanically connected.

7. The sensing device of claim 6 wherein the sensor is mechanically connected to the motor and the motor is mechanically connected to the resistive element by a shaft.

8. The sensing device of claim 6 wherein the motor is a d.c. motor.

9. The sensing device of claim 6 wherein the motor is a reversible motor.

10. A sensing device for sensing the presence and absence of a tool, said sensing device including a sensing head having a housing, a reversible motor mounted therein, a drive shaft rotatably driven by said motor and said drive shaft including an external portion projecting from one end of said housing, the sensing device comprising:

a sensing needle attached to said external portion of said drive shaft and extending generally radially therefrom, said sensing needle capable of contacting said tool in response to rotation of said drive shaft in a predetermined direction from a starting position; and a resistive element, located within said housing, coupled to said sensing needle through said drive shaft.

11. The sensing device of claim 10 wherein the resistive element is a variable resistor.

* * * * *